United States Patent
Ishitobi (10) Patent No.: US 7,764,588 B2
(45) Date of Patent: Jul. 27, 2010

(54) OPTICAL DISK APPARATUS AND CONTROL METHOD THEREOF

(75) Inventor: Tatsuya Ishitobi, Kawasaki (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 831 days.

(21) Appl. No.: 11/526,628

(22) Filed: Sep. 26, 2006

(65) Prior Publication Data

US 2007/0211610 A1    Sep. 13, 2007

(30) Foreign Application Priority Data

Mar. 10, 2006    (JP) .............................. 2006-065028

(51) Int. Cl.
    *G11B 7/00* (2006.01)
    *G11B 20/10* (2006.01)
    *G11B 5/09* (2006.01)
(52) U.S. Cl. .................. 369/116; 369/47.51; 369/59.11
(58) Field of Classification Search .............. 369/13.26, 369/47.5, 59.11, 116
    See application file for complete search history.

(56) References Cited

U.S. PATENT DOCUMENTS 5,276,671 A * 1/1994 Minami et al. .............. 369/116
7,298,681 B2 * 11/2007 Asada et al. ............. 369/47.51

FOREIGN PATENT DOCUMENTS

| JP | 02-143931 | 6/1990 |
| JP | 04-006636 | 1/1992 |
| JP | 2000-251266 | 9/2000 |

* cited by examiner

*Primary Examiner*—Andrea L Wellington
*Assistant Examiner*—Aneeta Yodichkas
(74) *Attorney, Agent, or Firm*—Antonelli, Terry, Stout & Kraus, LLP.

(57) ABSTRACT

An optical disc apparatus having a construction that lowers a peak value of a laser beam applied to an optical disc and controls a current supplied to the laser. Provisions are made to prevent recorded marks on the optical disc from degrading by utilizing the laser beam radiated onto the optical disc. Provisions are also made to minimize gradual deterioration of the laser itself that would otherwise be caused by the emission of laser beam, to minimize unwanted radio waves that would otherwise be produced from the optical disc apparatus by the emission of laser beam, and to prevent the responsiveness of the optical disc apparatus from being impaired.

12 Claims, 5 Drawing Sheets

OPTICAL DISK APPARATUS AND CONTROL METHOD THEREOF

BACKGROUND OF THE INVENTION

1. Field of the Invention

The present invention relates to a laser driving technology in an optical disc apparatus.

2. Description of the Related Art

In an optical disc apparatus an output of a laser is controlled according to a state of the apparatus. One such example is described in JP-A-4-6636. In a section titled "Means to Solve the Problems" in this official gazette, there is a description that "during a standby period when no recording or playback operation is performed, either the laser output is lowered or a high frequency superposition of the laser drive current is stopped." JP-A-2000-251266 in its paragraph [0077] has a description that "in a disc recorded with a CLV or MCLV method, when a seek operation is performed toward the inner circumferential side from the present beam spot position, the laser power is reduced from that of the normal playback operation, preventing a possible destruction of data."

Conventional optical disc apparatus do not take into consideration satisfactory measures against the problems that a laser beam radiated against an optical disc, even if its power level is for a playback, does degrade recorded marks on the optical disc and that the emission of the laser beam gradually deteriorates the laser itself. Nor do they adopt a satisfactory means to address the problem that lasing the laser generates unwanted radio waves from the optical disc apparatus and that avoiding the radio waves can impair the responsiveness of the optical disc apparatus.

SUMMARY OF THE INVENTION

The present invention is intended to solve the above problems. More specifically, it is an object of this invention to reduce a peak value of a laser beam radiated against the optical disc and control an electric current supplied to the laser so as to produce a sufficient light emitting power.

The above objective is realized by an optical disc apparatus comprising:

a power adjusting means to adjust a DC current supplied to a laser so that a light emitting power of the laser will be at a predetermined value;

a high frequency current source to supply a high frequency current to the laser; and a laser control means;

wherein, when data is played back from an optical disc, the laser control means supplies to the laser the high frequency current from the high frequency current source to cause the laser to repetitively alternate light emission and extinction and also supplies to the laser, in combination with the high frequency current, the DC current from the power adjusting means to stabilize the light emitting laser power at a predetermined value;

wherein, when data is not played back from the optical disc, the laser control means stops the current supply from the high frequency current source, causes the laser to emit light with the DC current supplied from the power adjusting means, and adjusts the current supply to the laser by the power adjusting means so that the light emitting laser power will be at the predetermined value;

wherein a switch from a state in which the high frequency current source stops supplying current to a state in which the high frequency current source supplies current is done by progressively increasing an amplitude of the high frequency current generated by the high frequency current source.

DESCRIPTION OF THE EMBODIMENTS

Figure 1:
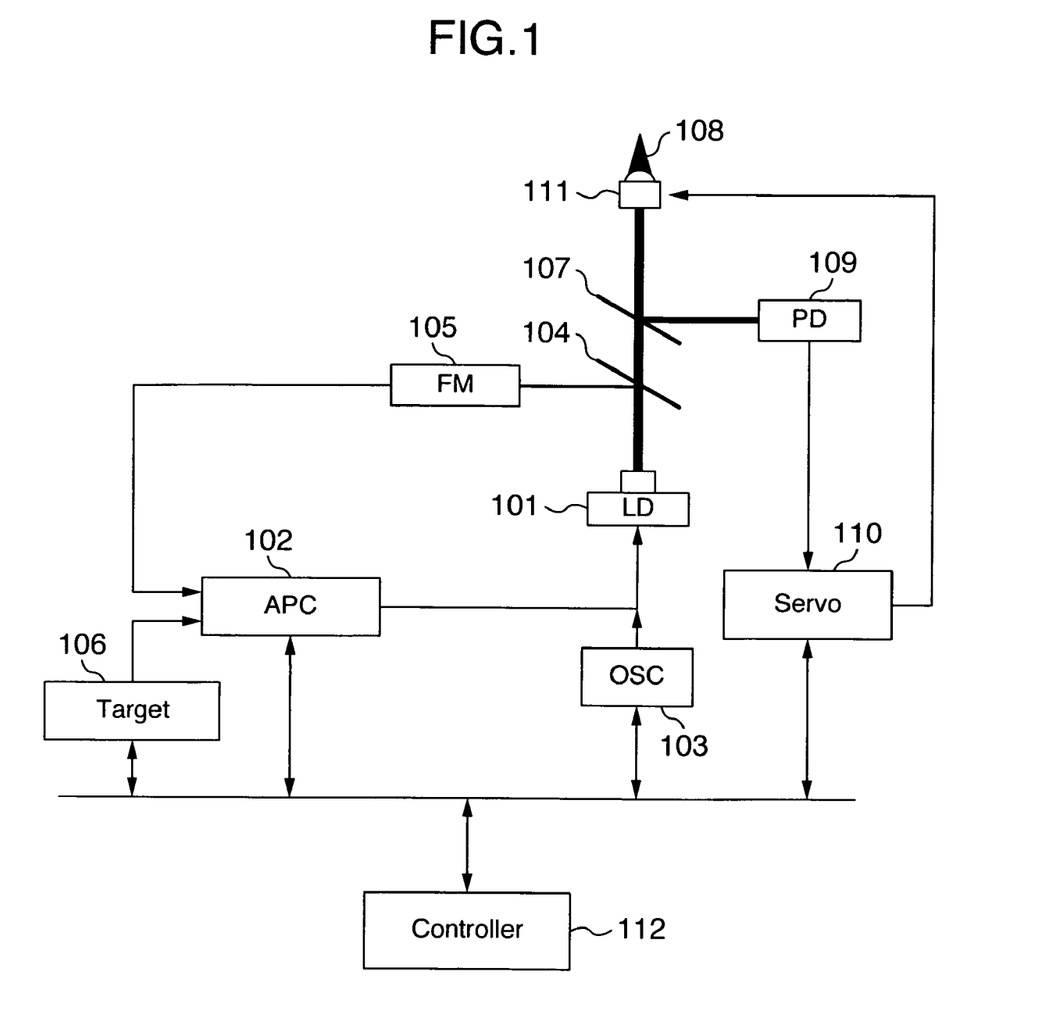
FIG. 1 illustrates one example configuration of the optical disc apparatus according to this invention.

FIG. 1 shows an example configuration of the optical disc apparatus embodying the present invention. In FIG. 1, denoted 101 is a laser. Reference number 102 represents an automatic power regulator that adjusts a DC current supplied to the laser 101 so that the light emitting power of the laser 101 will be at a predetermined level. Denoted 103 is a high frequency current source to supply a high frequency current to the laser 101. Designated 104 is a light separator that separates a beam emitted from the laser 101. Denoted 105 is a photodetector that generates a voltage according to the intensity of the beam emitted from the laser 101 and separated by the light separator 104. Denoted 106 is a voltage generator that generates a voltage according to a set value. Denoted 107 is a light separator that passes a beam that has passed through the light separator 104 and refracts a beam coming in the opposite direction, reflected by the optical disc. Denoted 108 is an objective facing the optical disc to focus the beam emitted from the laser 101 onto the optical disc. Denoted 109 is a photodetector that generates a voltage according to the intensity of the beam that has passed through the light separator 107 and reflected by the optical disc. Denoted 110 is a servo means that controls the beam emitted from the laser 101 to focus on the optical disc at a correct position on a recording groove in an appropriate spot size, i.e., performs a tracking control and a focusing control. Denoted 111 is an actuator controlled by the servo means 110 to drive the objective 108. Denoted 112 is a controller that controls various parts of the optical disc apparatus to control the laser and manages the operation of the entire optical disc apparatus. In FIG. 1 only those portions of the optical disc apparatus related to the present invention are shown, with other portions omitted.

In the following description, we will show that applying the lasing method of this invention to the optical disc apparatus of FIG. 1 makes it possible to play back in good condition data recorded in an optical disc over a long period of time and to prolong the life of the laser.

Figure 2:
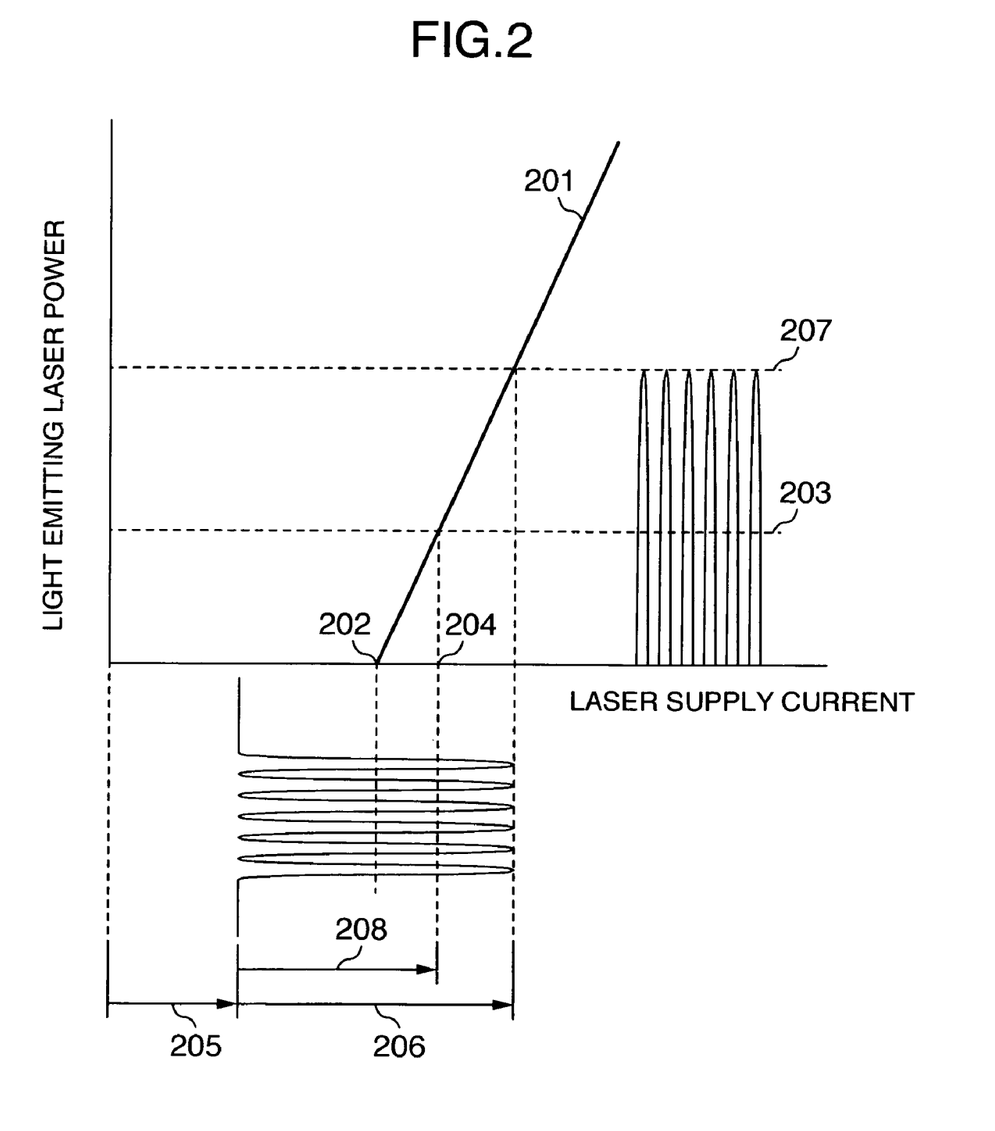
FIG. 2 illustrates a laser characteristic and a laser control method.

The laser mounted on the optical disc apparatus emits light with a power corresponding to the current supplied. The relation between the current supplied and the light emitting power is represented, for example, by a line 201 in FIG. 2. The laser characteristic of FIG. 2 is such that the laser begins to emit light when the current supplied exceeds the amount of current shown at 202, referred to as a threshold current. If we take the light emitting power indicated at 203 in FIG. 2 as a power required for playback, the laser needs only to be supplied the amount of current indicated at 204. However, in the optical disc apparatus, normally both a DC current indicated at 205 in FIG. 2 and a high frequency current indicated at 206 are supplied to the laser. With these currents supplied, the laser repetitively alternates the emitting of light with a peak power shown at 207 in FIG. 2 and light extinction. In the optical disc apparatus, the high frequency current and the DC current both supplied to the laser are adjusted so that an average power of the laser that alternately repeats light emission and extinction will be at a level shown at 203. The reason for causing the laser to repeat the light emission and extinction is to reduce noise and thereby reproduce data stably during data playback.

Applying a laser beam to an optical disc over a long period of time, even at a playback power, can progressively degrade recorded marks on the optical disc, deteriorating the quality of reproduced data. If the laser beam is radiated when the number of revolution of the disc is lower than a predetermined speed, the amount of laser beam radiated per unit time increases, which may also degrade or destroy the recorded marks on the optical disc even at the playback power.

To avoid this problem, it is effective to reduce the intensity of the laser beam. Simply reducing the laser power, however, will cause a signal component required for data playback to become smaller than noise, making the normal data playback impossible. Further, since the amount of light reflected from the optical disc that is necessary for server control becomes insufficient, the tracking control and the focusing control can no longer be performed stably, making the data playback impossible.

Under these circumstances, the present invention proposes a combined use of a first lasing method, a method employed by conventional optical disc apparatus which drives the laser to repetitively alternate light emission with a peak power shown at 207 in FIG. 2 and light extinction, and a second lasing method described later. The second lasing method involves replacing the high frequency current shown at 206 of FIG. 2 with the DC current shown at 208 and causing the laser to continuously emit light.

The laser beam produced by the second lasing method has a peak level at 203 of FIG. 2. This peak is about half the level of peak of the laser beam produced by the first lasing method, shown at 207 in FIG. 2, significantly reducing the probability of the recorded marks on the optical disc being degraded or destroyed. Since the average light emitting power produced by the second lasing method is set equal to that of the first lasing method, a sufficient amount of light reflected from the optical disc can reach the apparatus, allowing for a stable servo control.

The second lasing method may appropriately be applied when the optical disc apparatus is not playing back data but keeps a light spot on the optical disc following a recorded groove. When data needs to be played back, the first lasing method is activated to stably play back data with reduced noise.

When it is necessary to play back data, the second lasing method may be switched to the first lasing method, with the revolution speed of the optical disc set to a predetermined speed. When the second lasing method is applied, the peak power is about one-half that of the first lasing method although the average light emitting laser power is equal to that of the first lasing method. Therefore, when the revolution speed of the optical disc temporarily decreases, the probability of the recorded marks on the optical disc being destroyed can be lowered.

In the optical disc apparatus shown in FIG. 1, to realize the first lasing method and the second lasing method requires the controller 112 managing an overall operation of the optical disc apparatus to control the generation and stopping of high frequency current from the high frequency current source 103 and to make setting so that the voltage generator 106 generates a predetermined voltage.

Whichever of the first lasing method and second lasing method is activated, the photodetector 105 produces a voltage equivalent to the average of the light emitting laser power. This voltage is monitored by the automatic power regulator 102 which adjusts the DC current to the laser 101 so that the voltage equal to the one generated by the voltage generator 106 can be picked up at the photodetector 105, thus stabilizing the average light emitting laser power to a predetermined value whatever lasing method is used. At what power the laser is driven is determined by the controller 112 controlling the voltage generated in the voltage generator 106.

In switching from the second lasing method to the first lasing method, the controller 112 controls the high frequency current source 103 so that it oscillates, thereby supplying to the laser a DC current from the automatic power regulator 102 and a high frequency current from the high frequency current source 103, causing the laser to repetitively alternate light emission and extinction. Since the automatic power regulator 102 cannot quickly respond immediately after the high frequency current is supplied, the current is over-supplied to the laser, increasing the light emitting power. This state is detected by the automatic power regulator 102 through the voltage produced by the photodetector 105 and the current supply to the laser 101 is restrained so that the voltage generated by the voltage generator 105 will be equal to the voltage generated by the voltage generator 106, stopping the light emitting power from rising.

As described above, when the second lasing method is switched to the first lasing method, the light emitting power rises, though temporarily. This may destroy the recorded marks on the optical disc. A method for avoiding this problem will be explained by referring to a timing chart of FIG. 3.

Figure 3:
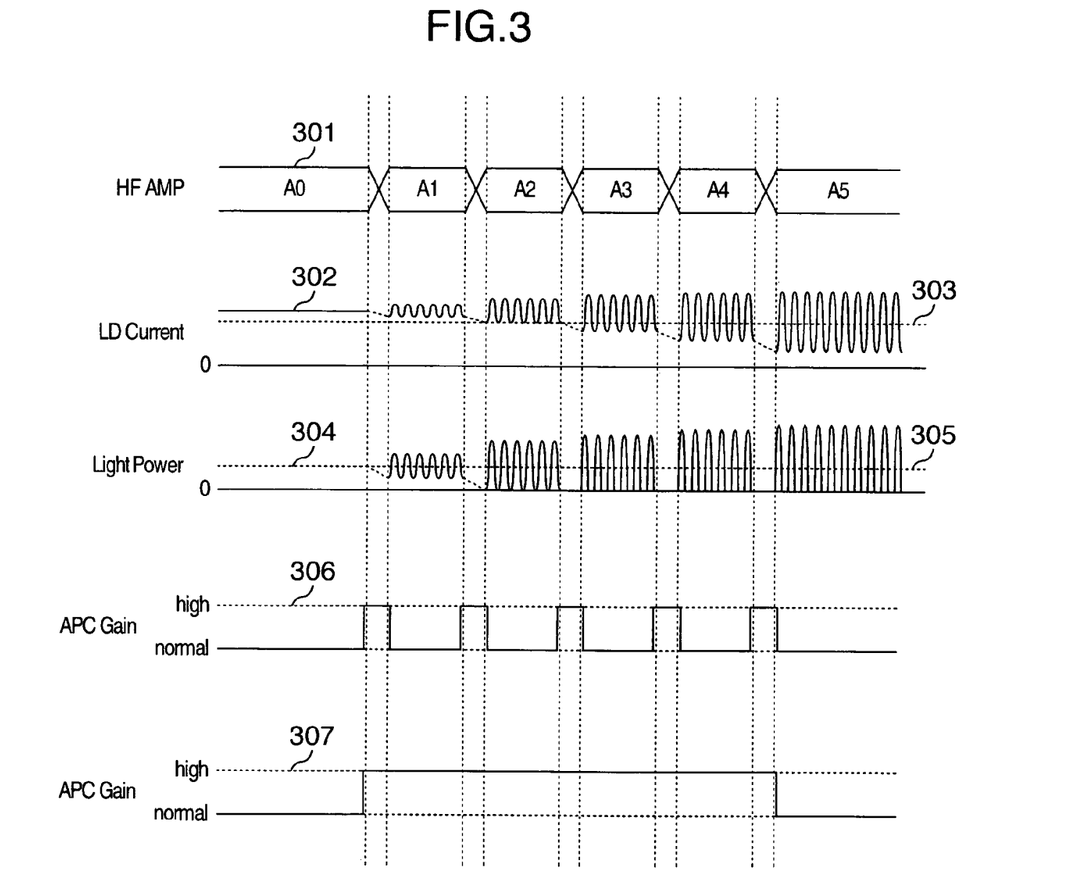
FIG. 3 is an operation timing chart for the optical disc apparatus of FIG. 1.

Denoted 301 in FIG. 3 is a command value that the controller 112 of FIG. 1 sets in the high frequency current source 103. According to this command value the high frequency current source 103 changes an amplitude of the high frequency current supplied to the laser 101. FIG. 3 shows that a command value A0 representing an oscillation halt state switches stepwise to command values A1, A2, A3, A4 representing progressively increasing amplitudes over time until finally a command value A5 representing a state where a predetermined amplitude is obtained is set in the high frequency current source 103. As the controller 112 changes stepwise the command value set in the high frequency current source 103, a current waveform supplied to the laser by the automatic power regulator 102 and the high frequency current source 103 changes as shown at 302 in FIG. 3 and the emitted light waveform of the laser 101 changes as shown at 304.

Changing stepwise the high frequency current generated by the high frequency current source 103 can minimize an increase in the light emitting power immediately after the amplitude of the high frequency current has been changed. So the minimal increase in the light emitting power can be quickly eliminated by the automatic power regulator 102. Further, since the increase in the light emitting power is minimized, the recorded marks on the optical disc can be prevented from destruction.

A dashed line 303 in FIG. 3 represents a threshold current for the laser. The laser emits light according to the amount of current in excess of this threshold. A dashed line 305 in FIG. 3 is a target playback power and it is seen that an average light emitting power remains constant if the light emitting waveform 302 changes.

To more quickly minimize the power increase immediately after the change in amplitude of the high frequency current, a control signal 306 in FIG. 3 may be sent from the controller 112 of FIG. 1 to the automatic power regulator 102 to enhance the response speed of the automatic power regulator 102 during the period when the high frequency current generated by the high frequency current source 103 is changed. It is also possible to send a control signal 307 in FIG. 3 from the controller 112 of FIG. 1 to the automatic power regulator 102 to enhance the response speed of the automatic power regulator 102 during the period when the amplitude of the high frequency current generated by the high frequency current source 103 changes to the final value.

During the process of switching from the first lasing method to the second lasing method, when the high frequency current source 103 stops the high frequency current being supplied, the light emitting power of the laser 101 decreases. After this, the automatic power regulator 102 increases a current supply to the laser 101 so that the light emitting power of the laser 101 increases to the predetermined value, thus eliminating the light emitting power fall. However, since the amount of light reflected from the optical disc drops though temporarily, the servo means 110 may not be able to perform the servo control stably.

To avoid this, the controller 112 needs only to change stepwise the command value set in the high frequency current source 103. In this case, the command value changing sequence is opposite to that of the signal 301 in FIG. 3, i.e., the command value A5 is progressively changed to A4, A3, A2 and A1 over time, reducing the amplitude of the high frequency current stepwise, and then is finally changed to the command value A0, at which time the supply of high frequency current from the high frequency current source 103 of FIG. 1 to the laser 101 is stopped, leaving the laser to emit light continuously with only the DC current supplied from the automatic power regulator 102. Since the light emitting power drop immediately after the command value has been changed is minimal, the drop of the light emitting power can be quickly eliminated by the automatic power regulator 102. Further, since the fall of the light emitting power is minimal, the servo control by the servo means will not become unstable. If the response speed of the automatic power regulator 102 is enhanced during the process of changing the command value, the power drop is more quickly eliminated. In this case, too, the controller 112 may control the response speed of the automatic power regulator 102.

Figure 4:
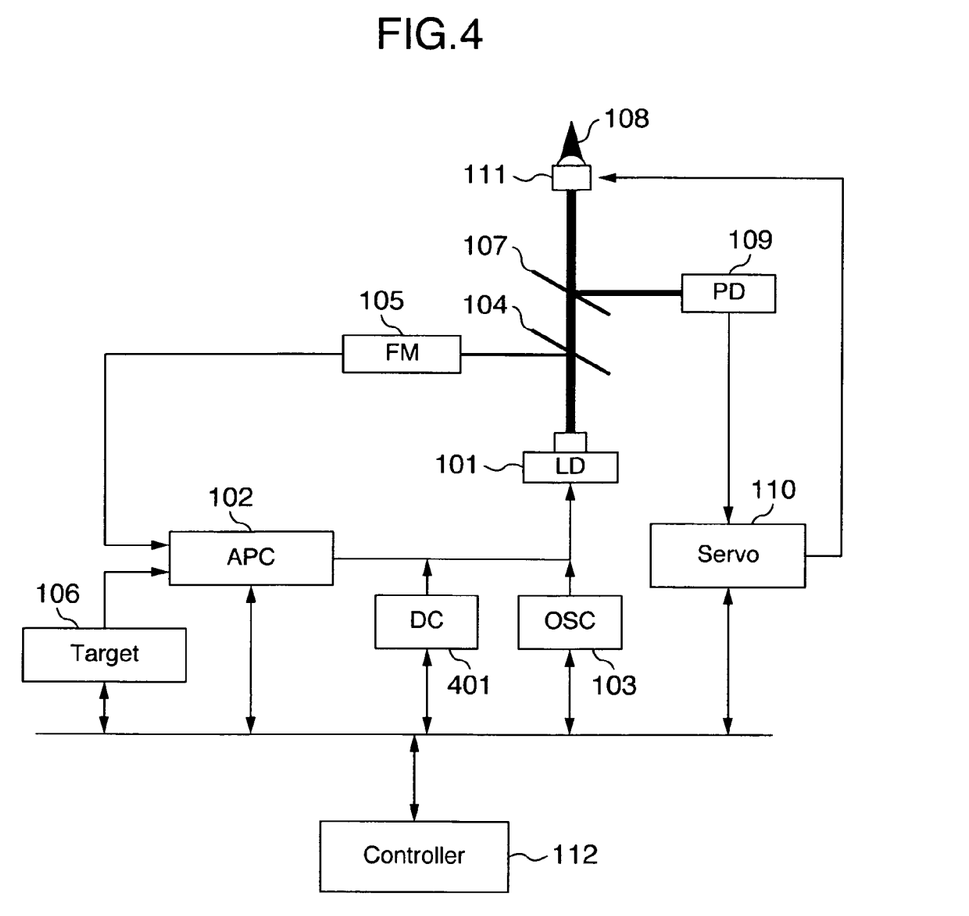
FIG. 4 illustrates another example configuration of the optical disc apparatus according to this invention.

To perform the switching between the first lasing method and the second lasing method more quickly, the optical disc apparatus needs only to have a configuration shown in FIG. 4. FIG. 4 shows a DC current source 401 added to the configuration of the optical disc apparatus of FIG. 1. The DC current source 401 supplies a DC current to the laser 101. The DC current from the DC current source 401 and the high frequency current from the high frequency current source 103 are supplied exclusively to perform the switching between the first lasing method and the second lasing method at high speed.

More specifically, when the first lasing method is activated, the DC current generated by the automatic power regulator 102 and the high frequency current generated by the high frequency current source 103 are supplied to the laser 101. When the second lasing method is applied, the DC current generated by the automatic power regulator 102 and the DC current generated by the DC current source 401 are supplied to the laser 101.

When switching from the first lasing method to the second lasing method, the supply of the high frequency current to the laser 101 is stopped at once, rather than progressively reducing the amplitude of the high frequency current being supplied. At the same time, the full DC current is supplied from the DC current source 401. When the second lasing method is switched to the first lasing method, the supply of the DC current to the laser 101 from the DC current source 401 is stopped at once. At the same time, the amplitude of the high frequency current generated by the high frequency current source 103 is raised to a predetermined value instantly. This prevents variations in the light emitting power that would otherwise be caused by the switching of the lasing method, thus making it unnecessary to wait for the light emitting power to stabilize, realizing a faster switching.

During the switching between the first lasing method and the second lasing method, when the currents are supplied simultaneously from both the high frequency current source 103 and the DC current source 401, though only for a moment, the light emitting power of the laser increases, giving rise to a possibility of the recorded marks on the disc being destroyed. To avoid this, the lasing method may be switched according to the timing chart of FIG. 5.

Figure 5:
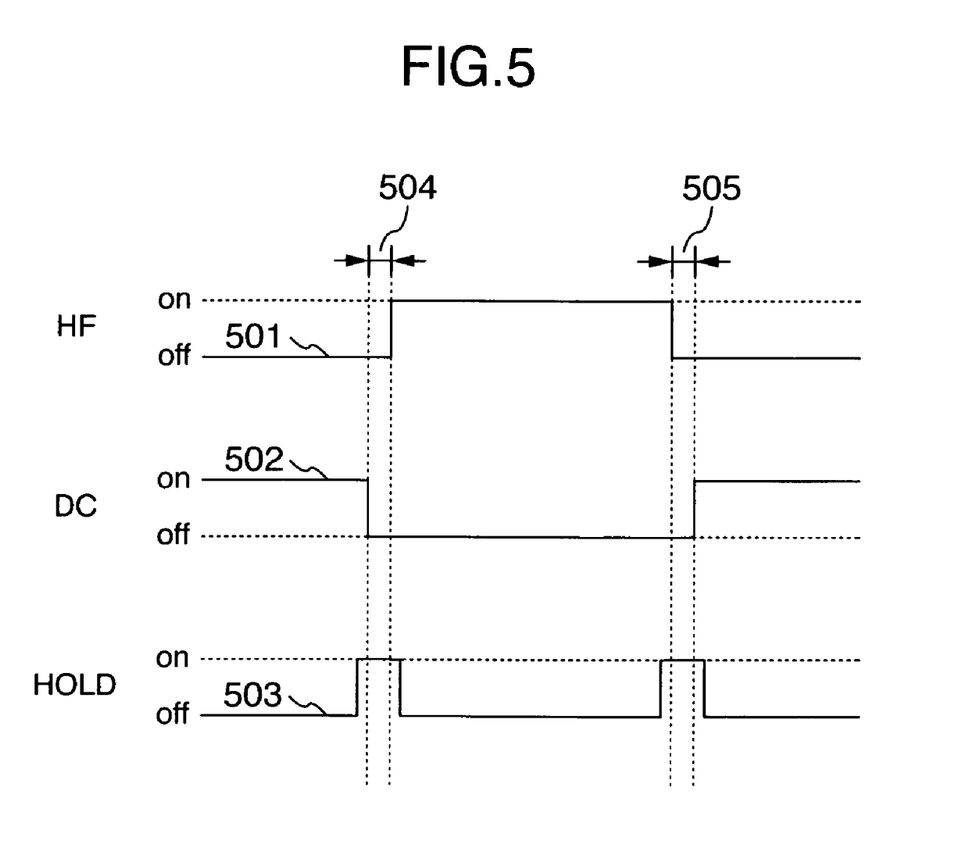
FIG. 5 is an operation timing chart for the optical disc apparatus of FIG. 4.

Denoted 501 in FIG. 5 is a control signal sent from the controller 112 of FIG. 4 to the high frequency current source 103. When the control signal 501 is at low level, the high frequency current source 103 stops oscillating; and when it is high, the high frequency current source 103 is oscillating. Shown at 502 in FIG. 5 is a control signal that the controller 112 of FIG. 4 sends to the DC current source 401. When the control signal 502 is low, the DC current source 401 stops generating the DC current; and when it is high, the DC current source 401 is generating the DC current.

When one wishes to oscillate the high frequency current source 103 and stop the generation of the DC current by the DC current source 401 from the state in which the DC current source 401 is generating the DC current and the high frequency current source 103 is at rest, the following procedure is taken. As shown at 504 in FIG. 5, first, the generation of the DC current by the DC current source 401 is stopped and then the high frequency current source 103 is oscillated. When one wishes to generate the DC current from the DC current source 401 and stop the oscillation of the high frequency current source 103 from the state in which the high frequency current source 103 is oscillating and the DC current source 401 is at rest, the following steps are taken. As shown at 505 in FIG. 5, first, the oscillation of the high frequency current source 103 is stopped and then the DC current is generated by the DC current source 401. This prevents the DC current from the DC current source 401 and the high frequency current from the high frequency current source 103 from being supplied simultaneously to the laser 101 even for a moment, so an instantaneous rise of the light emitting power of the laser 101 can be prevented and therefore the recorded marks on the disc from being destroyed.

Since at the timing of 504 and 505 in FIG. 5, no currents are supplied to the laser 101 from either the high frequency current source 103 or the DC current source 401, the light emitting power of the laser 101 drops instantaneously. At this time, to ensure that the instantaneous drop of laser power will not cause any response from the automatic power regulator 102 that monitors the light emitting power of the laser 101 through the photodetector 105 or from the servo means 110 that controls a light actuator 111 through the photodetector 109, a control signal shown at 503 in FIG. 5 may be sent from the controller 112 to the automatic power regulator 102 and the servo means.

An ultimate method for protecting the recorded marks formed on the optical disc involves stopping the current supply to the laser and not radiating a beam onto the disc when there is no need to playback or record data. Stopping the current supply to the laser can minimize degradation of the laser itself and unwanted radio waves generated by the optical disc apparatus.

However, once the light emission from the laser is stopped, when it is necessary to play back or record data, the necessary operations cannot be started immediately, impairing the responsiveness of the optical disc apparatus. So the light emission cannot be stopped frequently.

On the other hand, when data is not played back or recorded, this invention applies the second lasing method. This can protect the recorded marks on the optical disc and still keep the tracking control and the focusing control enabled, making it possible to start the playback or recording operations immediately when needed. Therefore, the responsiveness of the optical disc apparatus is not impaired. Further, with this invention, since the application of the second lasing method can reduce the peak level of the laser light emitting power, the degradation of the laser itself can be alleviated and its longevity prolonged. Further, since the number of times that the high frequency current is supplied to the laser can be reduced, the unwanted radio waves generated in the optical disc apparatus can also be suppressed.

The present invention can therefore allow the data recorded in the optical disc to be played back with high quality over a long period of time, prolong the life of the laser, and reduce unwanted radio waves from the optical disk apparatus. All these effects can be realized without impairing the responsiveness of the optical disc apparatus.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc apparatus comprising:
a power adjusting means to adjust a DC current supplied to a laser so that a light emitting power of the laser will be at a predetermined value;
a high frequency current source to supply a high frequency current to the laser; and
a laser control means;
wherein, when data is played back from an optical disc, the laser control means supplies to the laser the high frequency current from the high frequency current source to cause the laser to repetitively alternate light emission and extinction and also supplies to the laser, in combination with the high frequency current, the DC current from the power adjusting means to stabilize the light emitting laser power at a predetermined value;
wherein, when data is not played back from the optical disc, the laser control means stops the current supply from the high frequency current source, causes the laser to emit light with the DC current supplied from the power adjusting means, and adjusts the current supply to the laser by the power adjusting means so that the light emitting laser power will be at the predetermined value;
wherein a switch from a state in which the high frequency current source stops supplying current to a state in which the high frequency current source supplies current is done by progressively increasing an amplitude of the high frequency current generated by the high frequency current source.

2. An optical disc apparatus according to claim 1, wherein, when data playback from the optical disc is not performed and the current supply from the high frequency power source is stopped, the predetermined value of the light emitting laser power is a power value that allows a light spot to be stably servo-controlled on the optical disc.

3. An optical disc apparatus comprising:
a power adjusting unit to adjust a DC current supplied to a laser so that a light emitting power of the laser will be at a predetermined value;
a high frequency current source to supply a high frequency current to the laser; and
a laser control unit to control the laser and manage operation of the optical disc apparatus;
wherein, when data is played back from an optical disc, the laser control unit supplies to the laser the high frequency current from the high frequency current source to cause the laser to repetitively alternate light emission and extinction, and also supplies to the laser, in combination with the high frequency current, the DC current from the power adjusting unit to stabilize the light emitting laser power at a predetermined value;
wherein, when data is not played back from the optical disc, the laser control unit stops the current supply from the high frequency current source, causes the laser to emit light with the DC current supplied from the power adjusting unit, and adjusts the current supply to the laser by the power adjusting unit so that the light emitting laser power will be at the predetermined value;
wherein a switch from a state in which the high frequency current source is supplying the high frequency current to a state in which the high frequency current source stops supplying the current is done by progressively reducing an amplitude of the high frequency current generated by the high frequency current source.

4. An optical disc apparatus according to claim 3, wherein, when data playback from the optical disc is not performed and the current supply from the high frequency power source is stopped, the predetermined value of the light emitting laser power is a power value that allows a light spot to be stably servo-controlled on the optical disc.

5. An optical disc apparatus comprising:
a power adjusting unit to adjust a DC current supplied to a laser so that a light emitting power of the laser will be at a predetermined value;
a high frequency current source to supply a high frequency current to the laser;
a DC current source to supply a DC current to the laser; and
a laser control unit to control the laser and manage operation of the optical disc apparatus;
wherein, when data is played back from an optical disc, the laser control unit stops supplying current from the DC current source, supplies to the laser the high frequency current from the high frequency current source to cause the laser to repetitively alternate light emission and extinction, and also supplies to the laser, in combination with the high frequency current, the DC current from the power adjusting unit to stabilize the light emitting laser power at a predetermined value;
wherein, when data is not played back from the optical disc, the laser control unit stops the current supply from the high frequency current source, supplies to the laser the DC current from the DC current source to cause the laser to emit light, and also supplies to the laser, in combination with the DC current from the DC current source, the DC current from the power adjusting unit so that the light emitting laser power will be at a predetermined value;

wherein, when the current from the DC current source is supplied, the current supply from the high frequency current source is stopped and then the DC current source is made to start a current supply.

6. An optical disc apparatus according to claim 5, wherein, when data playback from the optical disc is not performed and the current supply from the high frequency power source is stopped, the predetermined value of the light emitting laser power is a power value that allows a light spot to be stably servo-controlled on the optical disc.

7. An optical disc apparatus comprising:
a power adjusting unit to adjust a DC current supplied to a laser so that a light emitting power of the laser will be at a predetermined value;
a high frequency current source to supply a high frequency current to the laser;
a DC current source to supply a DC current to the laser; and
a laser control unit to control the laser and manage operation of the optical disc apparatus;
wherein, when data is played back from an optical disc, the laser control unit stops supplying current from the DC current source, supplies to the laser the high frequency current from the high frequency current source to cause the laser to repetitively alternate light emission and extinction and also supplies to the laser, in combination with the high frequency current, the DC current from the power adjusting unit to stabilize the light emitting laser power at a predetermined value;
wherein, when data is not played back from the optical disc, the laser control unit stops the current supply from the high frequency current source, supplies to the laser the DC current from the DC current source to cause the laser to emit light, and also supplies to the laser, in combination with the DC current from the DC current source, the DC current from the power adjusting unit so that the light emitting laser power will be at a predetermined value;
wherein, when the current from the high frequency current source is supplied, the current supply from the DC current source is stopped and then the high frequency current source is made to start a current supply.

8. An optical disc apparatus according to claim 7, wherein, when data playback from the optical disc is not performed and the current supply from the high frequency power source is stopped, the predetermined value of the light emitting laser power is a power value that allows a light spot to be stably servo-controlled on the optical disc.

9. A control method for an optical disc apparatus comprising a power adjusting unit to adjust a DC current supplied to a laser so that a light emitting power of the laser will be at a predetermined value, and a high frequency current source to supply a high frequency current to the laser, the control method comprising:
when data is played back from an optical disc, supplying to the laser the high frequency current from the high frequency current source to cause the laser to repetitively alternate light emission and extinction, and also supplying to the laser, in combination with the high frequency current, the DC current from the power adjusting unit to stabilize the light emitting laser power at a predetermined value;
when data is not played back from the optical disc, stopping the current supply from the high frequency current source to cause the laser to emit light with the DC current supplied from the power adjusting unit, and adjusting the current supply to the laser by the power adjusting unit so that the light emitting laser power will be at the predetermined value; and
when a switch is made from a state in which the high frequency current source stops supplying current to a state in which the high frequency current source supplies current, progressively increasing an amplitude of the high frequency current generated by the high frequency current source.

10. A control method for an optical disc apparatus comprising a power adjusting unit to adjust a DC current supplied to a laser so that a light emitting power of the laser will be at a predetermined value, and a high frequency current source to supply a high frequency current to the laser, the control method comprising:
when data is played back from an optical disc, supplying to the laser the high frequency current from the high frequency current source to cause the laser to repetitively alternate light emission and extinction, and also supplying to the laser, in combination with the high frequency current, the DC current from the power adjusting unit to stabilize the light emitting laser power at a predetermined value;
when data is not played back from the optical disc, stopping the current supply from the high frequency current source to cause the laser to emit light with the DC current supplied from the power adjusting unit, and adjusting the current supply to the laser by the power adjusting unit so that the light emitting laser power will be at the predetermined value; and
when a switch is made from a state in which the high frequency current source is supplying current to a state in which the high frequency current source stops supplying current, progressively reducing an amplitude of the high frequency current generated by the high frequency current source.

11. A control method for an optical disc apparatus comprising a power adjusting unit to adjust a DC current supplied to a laser so that a light emitting power of the laser will be at a predetermined value, a high frequency current source to supply a high frequency current to the laser, and a DC current source to supply a DC current to the laser, the control method comprising:
when data is played back from an optical disc, stopping supplying current from the DC current source, supplying to the laser the high frequency current from the high frequency current source to cause the laser to repetitively alternate light emission and extinction, and also supplying to the laser, in combination with the high frequency current, the DC current from the power adjusting unit to stabilize the light emitting laser power at a predetermined value;
when data is not played back from the optical disc, stopping the current supply from the high frequency current source, supplying to the laser the DC current from the DC current source to cause the laser to emit light, and also supplying to the laser, in combination with the DC current from the DC current source, the DC current from the power adjusting unit so that the light emitting laser power will be at a predetermined value; and
when the current from the DC current source is supplied, stopping the current supply from the high frequency current source and then starting a current supply from the DC current source.

12. A control method for an optical disc apparatus comprising a power adjusting unit to adjust a DC current supplied to a laser so that a light emitting power of the laser will be at a predetermined value, a high frequency current source to supply a high frequency current to the laser, and a DC current source to supply a DC current to the laser, the control method comprising:

when data is played back from an optical disc, stopping supplying current from the DC current source, supplying to the laser the high frequency current from the high frequency current source to cause the laser to repetitively alternate light emission and extinction, and also supplying to the laser, in combination with the high frequency current, the DC current from the power adjusting unit to stabilize the light emitting laser power at a predetermined value;

when data is not played back from the optical disc, stopping the current supply from the high frequency current source, supplying to the laser the DC current from the DC current source to cause the laser to emit light, and also supplying to the laser, in combination with the DC current from DC current source, the DC current from the power adjusting unit so that the light emitting laser power will be at a predetermined value; and when the current from the high frequency current source is supplied, stopping the current supply from the DC current source and then starting a current supply from the high frequency current source.

* * * * *